United States Patent
Hickey et al.

(10) Patent No.: US 7,519,171 B2
(45) Date of Patent: *Apr. 14, 2009

(54) METHOD OF SHARING AND TRANSFERRING INFORMATION BETWEEN ISDN TELEPHONES

(75) Inventors: Edward Michael Hickey, Round Lake Beach, IL (US); Robert John Laitman, LaGrange Park, IL (US)

(73) Assignee: AT&T Intellectual Property I, LP, Reno, NV (US)

( * ) Notice: Subject to any disclaimer, the term of this patent is extended or adjusted under 35 U.S.C. 154(b) by 804 days.

This patent is subject to a terminal disclaimer.

(21) Appl. No.: 11/072,554

(22) Filed: Mar. 3, 2005

(65) Prior Publication Data

US 2005/0152514 A1    Jul. 14, 2005

Related U.S. Application Data

(63) Continuation of application No. 10/644,593, filed on Aug. 19, 2003, now Pat. No. 6,879,666, which is a continuation of application No. 09/391,566, filed on Sep. 8, 1999, now Pat. No. 6,643,356, which is a continuation of application No. 08/953,842, filed on Oct. 14, 1997, now Pat. No. 5,995,595.

(51) Int. Cl.
*H04M 3/42* (2006.01)

(52) U.S. Cl. ............... 379/212.01; 370/271; 379/88.12; 379/88.22; 379/93.11; 379/215.01; 709/238

(58) Field of Classification Search ............ 370/271; 379/67.1, 88.12, 88.18, 88.22, 93.11, 110.01, 379/211.02, 212.01, 215.01; 709/238

See application file for complete search history.

(56) References Cited

U.S. PATENT DOCUMENTS 5,023,868 A * 6/1991 Davidson et al. ............ 370/270

(Continued)

FOREIGN PATENT DOCUMENTS

EP    0 736 989 A2    10/1996

(Continued)

OTHER PUBLICATIONS

"New messaging facilities at the SOPHO-S operator desk," PTR Philips Telecommunication Review, vol. 51, No. 1, Mar. 1993, pp. 11-17.

(Continued)

*Primary Examiner*—Fan Tsang
*Assistant Examiner*—Hemant Patel
(74) *Attorney, Agent, or Firm*—Brinks Hofer Gilson & Lione

(57) ABSTRACT

A method of automatically sharing and transferring information between a Work at Work (WAW) ISDN telephone and a Work at Home (WAH) ISDN telephone. This information includes, calling line identifier delivery from the WAW telephone to the WAH telephone, facilitating subsequent transferring of the call to the WAH telephone if desired. Message waiting status is also shared, facilitating the coordination of message waiting lamps at both the WAW and WAH telephone. Information from one telephone to the other is carried transparently through the ISDN network as user-to-user information, calling party subaddress, D channel X.25 packet message, lower layer compatibility or a combination of these elements. The telephones automatically establish ISDN calls between themselves and swap information pertaining to the status of the companion telephones.

9 Claims, 10 Drawing Sheets

U.S. PATENT DOCUMENTS

| | | | |
|---|---|---|---|
| 5,140,629 A * | 8/1992 | Lee .............................. 379/70 |
| 5,204,861 A | 4/1993 | Wiebe |
| 5,422,942 A * | 6/1995 | Kakwashima .......... 379/212.01 |
| 5,521,964 A * | 5/1996 | Schull et al. ............. 379/88.12 |
| 5,644,625 A * | 7/1997 | Solot ....................... 379/88.22 |
| 6,058,167 A * | 5/2000 | Iglehart et al. ........... 379/93.17 |
| 6,415,143 B1 * | 7/2002 | Andre ....................... 455/417 |
| 6,738,616 B1 * | 5/2004 | Cardina et al. .............. 455/417 |
| 2002/0009187 A1 * | 1/2002 | Inoue et al. ............ 379/212.01 |

FOREIGN PATENT DOCUMENTS

| | | |
|---|---|---|
| JP | 62281654 | 12/1987 |
| JP | 63236459 | 10/1988 |
| JP | 01120161 | 5/1989 |
| JP | 02153662 | 6/1990 |
| JP | 02206270 | 8/1990 |
| JP | 05219236 | 8/1993 |

OTHER PUBLICATIONS

Supplementary Search Report for European counterpart application No. EP 98 95 2264, dated Feb. 14, 2005, 5 pages.

Integrated Services Digital Network (ISDN); Message Waiting Indication (MWI) supplementary service ; Service Description; pr ETS 300 650; May 1996; 16 pages.

* cited by examiner

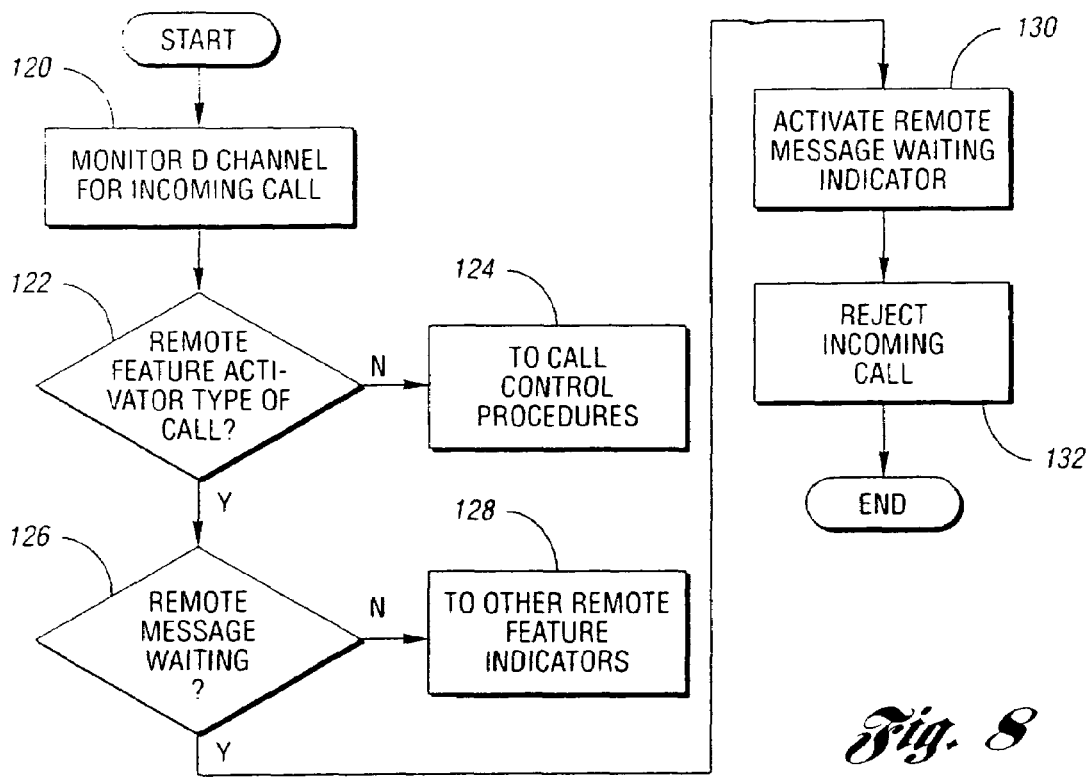

Fig. 10

| 3rd PARTY | REMOTE FEATURE INDICATION (MESSAGE WAITING - OFF) | |
|---|---|---|
| | WORK AT WORK PHONE | WORK AT HOME PHONE |
| | VOICE MAIL PICKED UP. LOCAL SWITCH SENDS DEACTIVATE FEATURE FOR MESSAGE WAITING. PHONE RESPONDS BY SENDING CALL TO WAH PHONE THAT CONTAINS CODING TO EXTINGUISH THE LIGHT. | |
| | | ← INCOMING CALL CONTAINING THE FEATURE INFORMATION. |
| | CALL CLEARED | ← CALL REJECTED REMOTE MWT LAMP EXTINGUISHED |

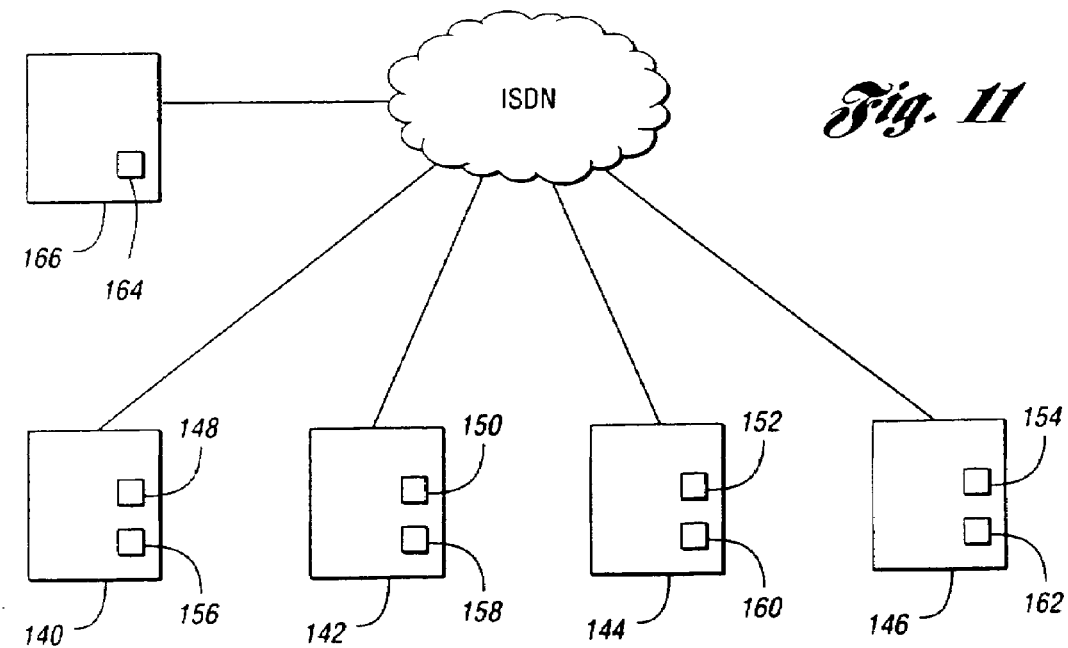

Fig. 11

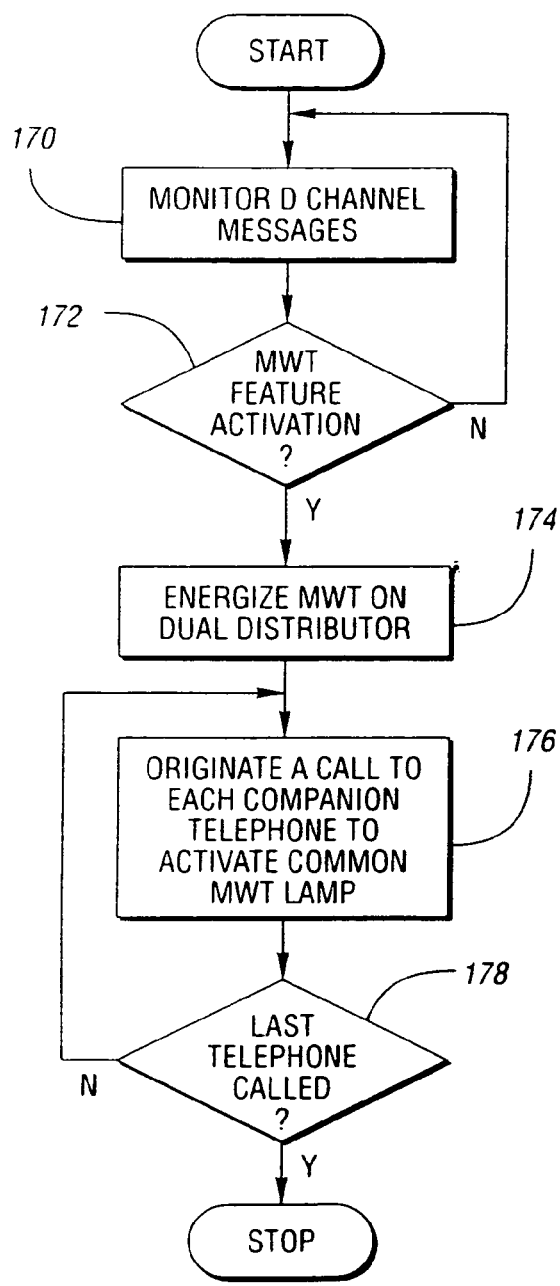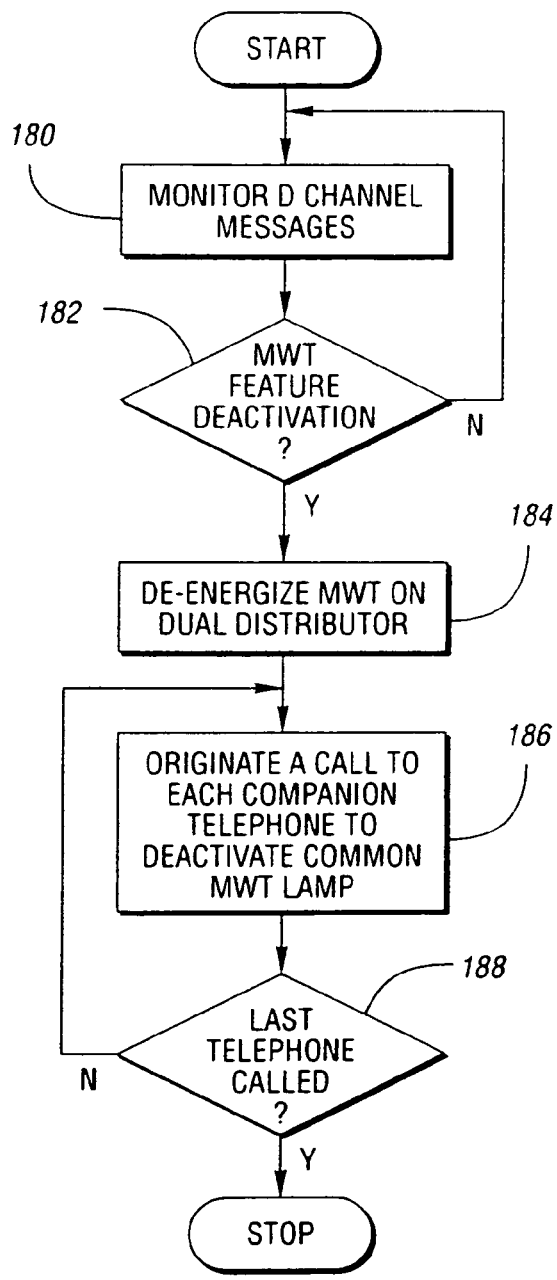
Fig. 13
Fig. 15

US 7,519,171 B2

METHOD OF SHARING AND TRANSFERRING INFORMATION BETWEEN ISDN TELEPHONES

RELATED APPLICATIONS

This application is a continuation of application Ser. No. 10/644,593, filed on Aug. 19, 2003 now U.S. Pat. No. 6,879,666, which is a continuation of application Ser. No. 09/391,566, filed on Sep. 8, 1999, now U.S. Pat. No. 6,643,356, which is a continuation of application Ser. No. 08/953,842, filed Oct. 14, 1997, now U.S. Pat. No. 5,995,595.

BACKGROUND

1. Technical Field.

This invention relates to transferring information between telephones in an Integrated Services Digital Network (ISDN) and more particularly to the sharing and transferring of information between an ISDN telephone located at a users workplace (work at work telephone) and an ISDN telephone located in the users home (work at home telephone).

2. Background Information

ISDN is capable of transferring data messages transparently between ISDN telephones. ISDN operates according to the call control methods and procedures defined by Bellcore in the National ISDN Technical Requirements. The Bellcore requirements specify information elements such as user-to-user information, calling sub-address information, and lower layer compatibility. ISDN also has the capability of sending X.25 data on the network. These information elements do not exist in any prior art analog service. ISDN basic rate service operates on a 2B+D configuration, that is, two 64 kilobyte per second B or bearer channels and one 16 kilobyte per second D or delta channel.

It has been proposed to use ISDN information elements to pass a calling party number received at a first ISDN telephone to a second ISDN telephone prior to transferring the call to the second telephone. See, for example, the patent to Kakwashima U.S. Pat. No. 5,422,942. One problem with this prior art call transfer method is that communication between the calling party and the second ISDN telephone is completed through the first ISDN telephone, occupying at least one channel of the first ISDN telephone until completion of the call.

SUMMARY

The present invention proposes a method of transferring information between ISDN telephones that are operable in either a local or remote mode of operation. The telephones are placed in the local mode of operation when the user is available to accept calls and is placed in the remote operation mode if the user wishes incoming calls or other information to be transferred to a companion phone at a different location. The selection of the telephone mode of operation may be controlled either locally or from a remote location.

In accordance with the present invention, a telephone placed in a remote operation mode upon receipt of an incoming call, automatically inserts appropriate information such as calling line identification into a call origination function and shares that information with its companion telephone. The companion telephone uses the information to illuminate indicators, display messages and, if desired, request transfer of the incoming call. The present invention also provides a message waiting feature that notifies one of the telephones of any messages that have been left as a result of unanswered calls to the companion telephone. A common message waiting feature is also provided that permits a plurality of telephones to be informed of a waiting message that may be answered by a user at any one of the telephones.

BRIEF DESCRIPTION OF THE DRAWINGS

FIGS. 7 and 8 show flowcharts of the call waiting feature of the present invention;

FIG. 9 is a timeline of the sequence of events to remotely activate the message waiting indicator;

FIG. 10 is a timeline of the sequence of events to remotely deactivate the message waiting and indicator;

FIG. 11 is a system block diagram showing a dual message waiting distributor for controlling a common message waiting lamp on a plurality of telephones;

FIG. 13 is a flowchart of software controlling activation of the dual message waiting indicators by the distributor of FIG. 11;

FIG. 15 is a flowchart of software controlling deactivation of the dual message waiting indicators by the distributor of FIG. 11.

DETAILED DESCRIPTION OF THE DRAWINGS AND THE PRESENTLY PREFERRED EMBODIMENTS

Figure 1:
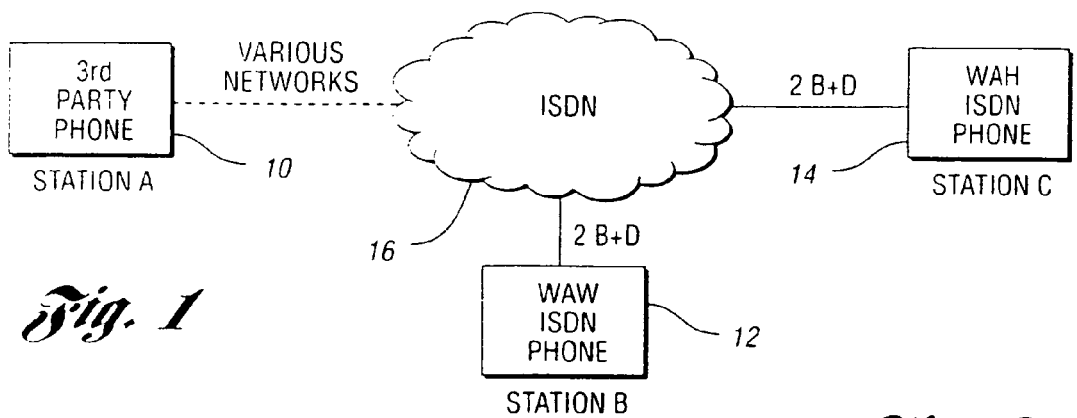
FIG. 1 shows three telephone connected with a typical ISDN.

Referring now to the drawings and initially to FIG. 1, Station A includes a telephone 10 from which a call is made by a calling or third party. Station B, includes a work at work (WAW) ISDN telephone 12, and Station C includes a work at home (WAH) ISDN telephone 14. Although only three telephones are shown, it is understood that a large number of ISDN telephones are connected with the network indicated generally at 16. The ISDN 16 could be any of the commonly used North American ISDN switches. In order to practice the invention, the telephones at Stations B and C must be compatible ISDN telephones but it is not necessary for the telephone at Station A to be an ISDN telephone. By using standard ISDN signaling messages, the telephones at Stations B and C can automatically pass information to the other.

Figure 2:
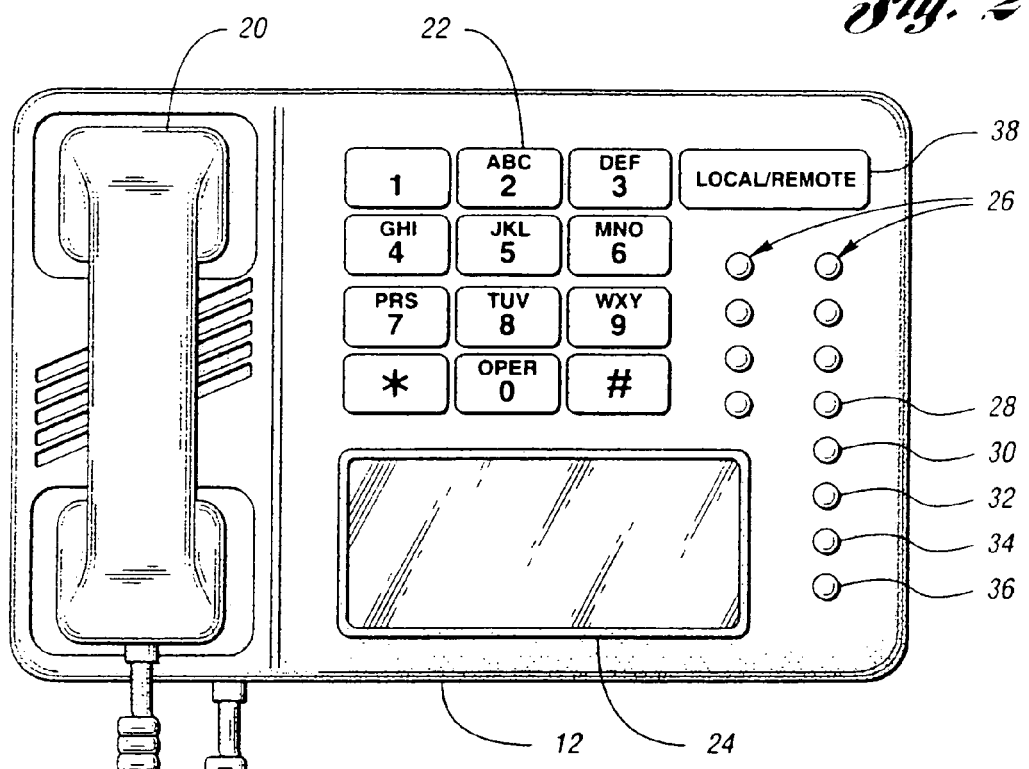
FIG. 2 shows an ISDN telephone used at Stations B and C in practicing the present invention.

As shown in FIG. 2, each of the ISDN telephones or user telephones 12 or 14 includes a handset 20, a telephone keypad 22 and a display 24 for visually displaying messages. Each ISDN telephone further includes a plurality of call appearance or feature lamps 26 including a REMOTE OFFICE MONITOR 28, a WORK AT WORK MESSAGE WAITING lamp 30, a WORK AT HOME MESSAGE WAITING lamp 32, a MUTE key/lamp 34, and a SPEAKERPHONE key/lamp 36. Each ISDN telephone includes a LOCAL/REMOTE switch activator 38, manually selectable by the user or remotely selectable via the local serving ISDN switch. The activator 38 may be a pushbutton that is illuminated in the REMOTE position. If the user operates the pushbutton 38 locally, a flag is set to notify the software controlling the telephone of the desired mode of operation. A user may also set the mode of operation of a companion telephone to the Remote mode. For example the telephone 12 may be switched to the Remote mode from the telephone 14 by lifting the handset 20 to go "off hook", pressing the Local/Remote toggle switch 38 and when prompted dialing the number of the telephone 12.

Each ISDN telephone 12 or 14 transmits information to and receives information from ISDN 16 in two 64 kiobyte per second channels referred to as B-channels and in one 16 kilobyte per second channel referred to as a D-channel. Each B-channel is separately circuit-switched by network 16 to other user telephones (either ISDN or analog). The D-channel is used both to convey signaling packets to effect message signaling between ISDN telephones and the network 16, in particular the ISDN switch or control arrangement at the heart of the network 16, and to convey data packets between different ISDN telephones. The message signaling is referred to as out-of band signaling since it occurs in the D-channel outside the bandwidth of the voice communication.

Figure 3:
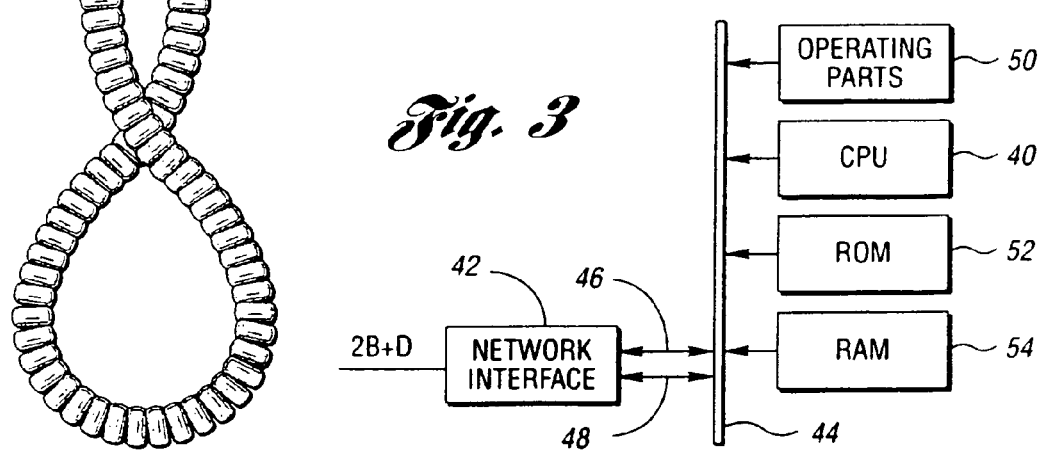
FIG. 3 is a block diagram of the computer in the ISDN telephone.

As shown in FIG. 3, the ISDN telephones at Stations B and C contain a CPU 40 that, in addition to providing call control and network features control, monitors the status of certain programmable features. These programmable features are chosen and set at the time of installation. The CPU 40 exchanges call control information via a network interface 42 over a system bus 44 that includes the usual data bus, address bus, and control bus. The interface 42 provides connection between the system bus 44 and the ISDN signaling channel 46, and the communication channel 48. An incoming call is presented as a D channel message to the network interface 42 which passes the D channel message through the signaling channel 46 to the system bus 44. The operating parts of the telephone, i.e. dial, calling mechanism, ringers, lamps, etc. are indicated at 50. The CPU 40 functions in accordance with the instructions stored in ROM 52, that establish call control procedures. A RAM 54 contains information such as the directory number of the work at home telephone, the features to be monitored, special instructions such as circuit assurance, and any passwords.

Figure 4:
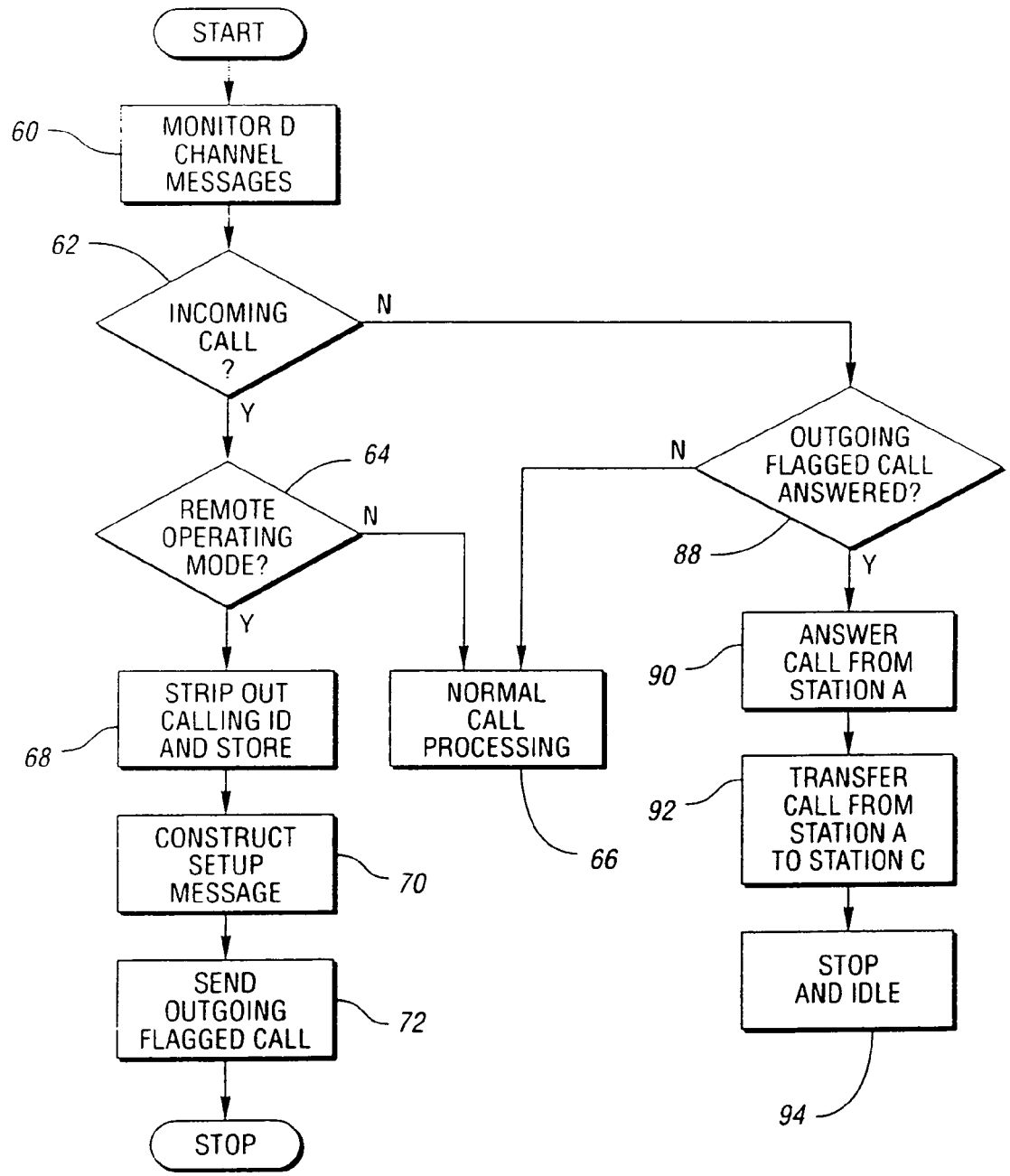
FIGS. 4 and 5 are flowcharts of the call transfer procedure of the present invention.

Referring again to FIG. 1 and to the flowchart of FIG. 4, the call transferring procedure of the present invention will be described. It is assumed that a telephone user at Station A places a call to the WAW telephone 12 at Station B. Further, it is assumed that the Station B site is unattended and the WAW telephone 12 has been placed in the remote operation mode by activating the LOCAL REMOTE pushbutton 38. Since Station B is an unattended site, the WAW telephone 12 will ring no answer, transmit calling line ID information to Station C, and if requested by the WAH telephone 14, transfer Station A's call to Station C. The flowchart of FIG. 4 represents instruction contained in the ROM of telephone 12. In FIG. 4, incoming D channel messages are monitored at block 60. At block 62 a determination is made as to whether an incoming call is present. At block 64 a check is made to determine whether the WAW telephone 12 is in the local or remote mode. If in the local mode, normal call processing continues as indicated at block 66. If the WAW telephone 12 is in the remote operating mode, the incoming calling line ID is stripped out and stored in RAM 54 as indicated at block 68. In blocks 70 and 72, a setup message is constructed and sent over the D channel. The outgoing setup message from Station B to Station C, contains the calling line ID of Station A either in the user to user, calling party subaddress, or lower layer compatibility information elements. Along with the calling line ID, a flag or code is included to indicate to Station C that this call is from the WAW telephone 12. The constructed setup message is transmitted to the ISDN network 16 via the system bus 44, the signaling channel 46, and the network interface 42.

Figure 5:
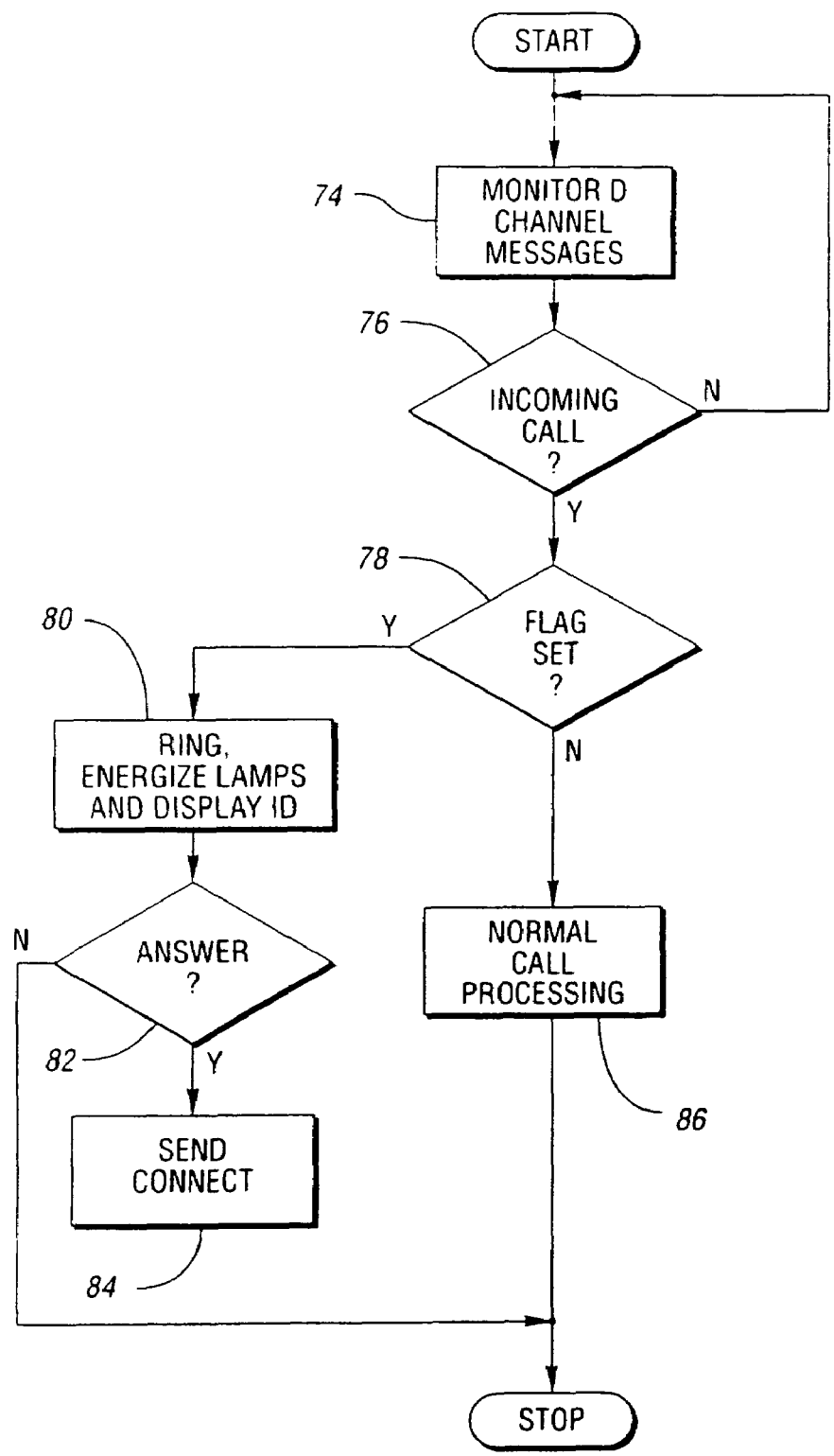

Referring now to FIG. 5, a flowchart of a portion of the software that controls operation of the WAH telephone 14 at Station C is shown. Incoming D channel messages are monitored at block 74. At block 76 a determination is made as to whether an incoming call is present. If the call is from the WAW telephone 12, the flag or code contained in a D channel message will be detected at block 78. At block 80 the WAH telephone will produce an audibly alert (ring), a visual alert by energizing one of the lamps 26, display Station A's calling line ID on display 24, and energize a lamp indicating that this call is being received from the WAW telephone 12. If the user chooses to ignore the incoming call, the telephone will continue to ring until the call is either answered or abandoned. If the call is answered, as detected at block 82, the WAH telephone 14 responds with the usual Q.931 signaling messages, stored in ROM 52, as indicated at block 84. If the flag or code in the D channel message is not present as determined at block 78, indicative of a call from other than the WAW telephone 14, then normal call processing continues as indicated at block 86.

Figure 6:
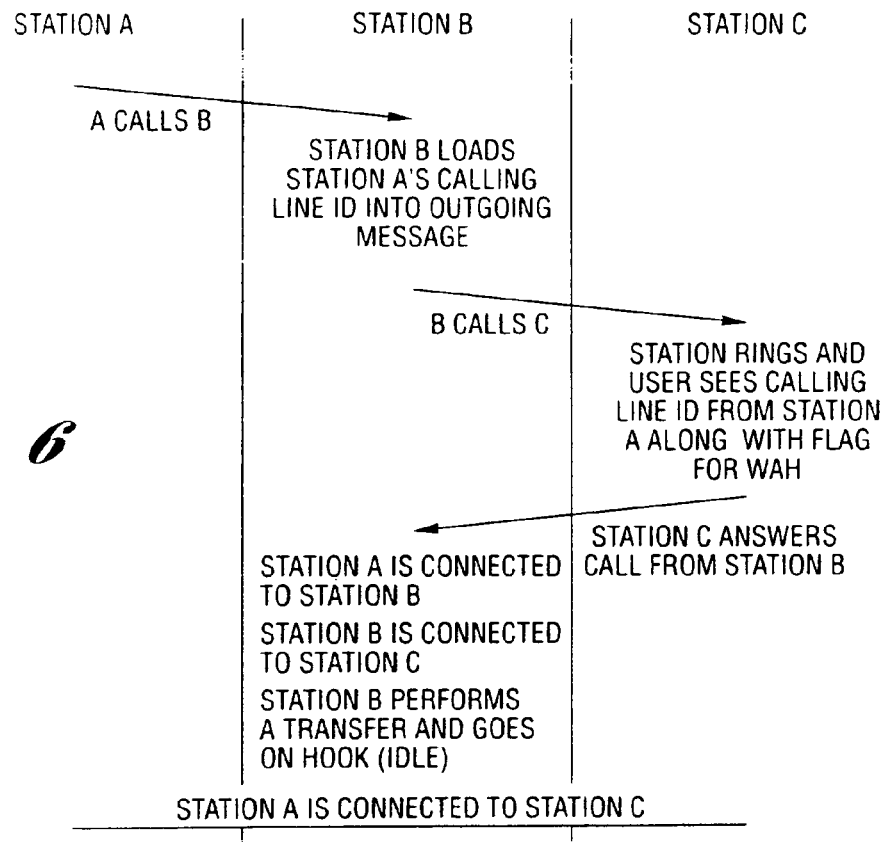
FIG. 6 is a timeline showing the relationship between telephones during transfer of a call.

Returning to FIG. 4, WAW telephone 12 continues to monitor the D channel to determine if its outgoing call containing Station A's calling line ID has been answered. If so, WAW telephone 12 detects the answer at block 88 and automatically answers the incoming call from Station A, as indicated at block 90. The WAW telephone 12 then initiates a network transfer using the usual Q.931 signaling messages stored in ROM 52, as indicated at block 92. Third party telephone 10 at Station A will now be connected to WAH telephone 14 at Station C, and WAW telephone 12 at Station B will become idle, as indicated at block 94. FIG. 6 is a timeline showing the relationship between Stations A, B, and C during the transfer of calls from Station A to Station C.

It will be understood that the Calling Line ID could be delivered to the WAH telephone without subsequently transferring the call. ID delivery even without call transfer would permit logging at Station C of calls made to a remote telephone for example at Station B. Also, WAW telephone 12 may store a list of telephone numbers in RAM 54 and "challenge" the incoming call. Only those calls allowed in the screening list would be passed on the WAH telephone 14.

If WAH telephone 14 at Station C elects not to answer the incoming call, WAW telephone 12 at Station B will eventually Call Forward Don't Answer to Voice Mail. Both Call Forward Don't Answer and Voice Mail are conventional network features of the ISDN 16. When Call Forward Don't Answer takes place, WAW telephone 12 will respond with the usual Q.931 signaling messages stored in ROM 52. The local network switch will send a feature activator to WAW telephone 12 to energize lamp 30, indicating the presence of voice mail.

Remote Message Waiting Indicator

A message waiting indicator is typically a visual indication on a telephone, such as a lamp, to notify a user that a caller has left voice mail. If the pushbutton 38 is in the Local operation mode, after a given interval, typically three rings, Station A's call to the WAW telephone 12 at Station B will Call Forward Don't Answer to voice mail. The Call Forward Don't Answer is a function of the ISDN switch serving telephone 12. After the user at Station A leaves voice mail, Station B's serving ISDN switch will send a D channel signaling message to activate the message waiting (MWT) lamp or indicator 30 on WAW telephone 12. This indicates to the user of the WAW telephone 12 that voice mail is stored.

Figure 7:
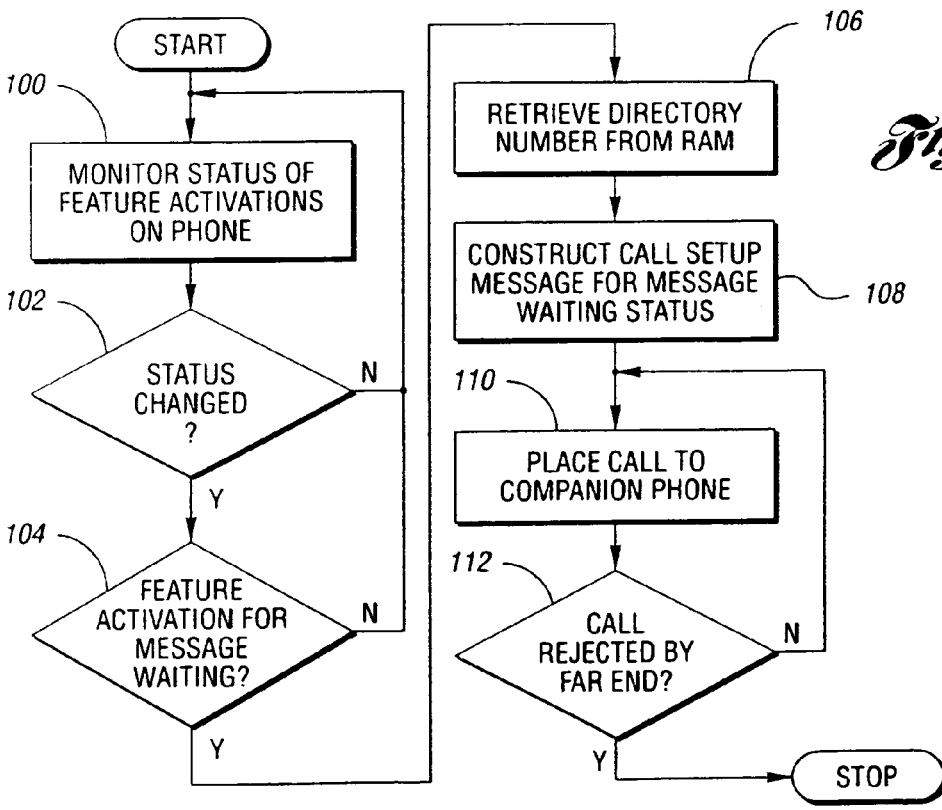

Referring to FIGS. 7 and 8, flowcharts are depicted of the message waiting feature implemented by instruction in the ROM 52 of the ISDN telephones 12 and 14 respectively. The flowcharts will be described with reference to the incoming call originally placed from telephone 10 to WAW telephone 12. At block 100, the CPU 40 of the WAW telephone 12, monitors the status of the switch programmable Customer Premises Equipment (CPE) features. At block 102, the CPU 40 detects whether the status of a programmable feature activation has changed. If so, and the feature activation is for message waiting, as determined at block 104, the CPU 40 retrieves a directory number for the WAH telephone 14 from RAM 54 and constructs a D channel setup message, as indicted at block 106 and 108 respectively. A call is then automatically placed to the companion telephone, in this case the WAH telephone 14 as indicated at block 110. The outgoing call will contain information in the user to user, calling party subaddress, or lower layer compatibility information element to describe to the called WAH telephone 14, the new status of the specific indicator, in this instance the message waiting feature. WAW telephone 12 at Station B will then wait for the outgoing call to be rejected by the WAH telephone 14 at Station C, as detected by the block 112.

Referring now to FIG. 8, the WAH telephone 14 monitors the D channel traffic at block 120. When traffic is detected, a determination is made at block 122 whether the traffic is an incoming call from a voice user (another person wanting to talk), or a remote feature activator. If the call is a user wanting to talk, the normal call control procedures will be followed as indicated at block 124. If the call is a remote feature activator, a check is made at block 126 to determined whether the remote feature activator is a remote message waiting indicator. If the call was not a remote message waiting indicator, the CPU 40 will check the code for other remote feature indicators at block 128.

If the call is a remote message waiting indicator, the CPU 40 will activate the corresponding indicator at WAH telephone 14 at Station C as indicated at block 130. At block 132, the CPU 40 rejects the incoming call per the instructions stored in ROM 52. Since the call is rejected, there is no notification of an incoming call to the user, i.e. no audible ring, no flashing lights, etc. If and when the voice mail is retrieved, the local network switch sends a message waiting deactivation code in the same fashion, that will be detected to extinguish the message waiting lamp. FIGS. 9 and 10 show timelines of the sequence of events to respectively remotely activate and deactivate the MWT indicator as described above.

As stated above, at block 128 other remote feature indicators may be processed. For example, the status of call appearance information to be used as remote BLF (Busy Lamp Field) indicators may be carried in a similar fashion. A remote BLF along with a speed dial DSS (Direct Station Select): allows a user to perform ISDN attendant console functions from a distant office location. The status of the call appearances is processed in the same way as the remote message waiting indicator. Further, control of the status of the Local/Remote pushbutton 38 from a remote Station may be accomplished in a similar manner.

Dual Message Waiting Indicators

Referring now to FIGS. 11-15, a multiple message waiting feature is disclosed. The desirability of having multiple message waiting indicators arises when a user wishes to maintain a personal voice mail box separate from a company or common voice mail box. The common voice mail box is used when a caller wishes to place a message that may be answered by any one of a plurality of individuals.

With reference to FIG. 11, each of the ISDN telephones 140-146, such as shown in FIG. 2, is provided with two message waiting indicators such as personal MWT lamps 148-154, and common MWT lamps 156-162. A dual MWT distributor 166 having a common MWT lamp 164, functions similarly to the WAW telephone 12 in the previous examples with the exception that the distributor makes calls to multiple telephones in order to cause the common remote message waiting indicators to be energized.

Figure 12:
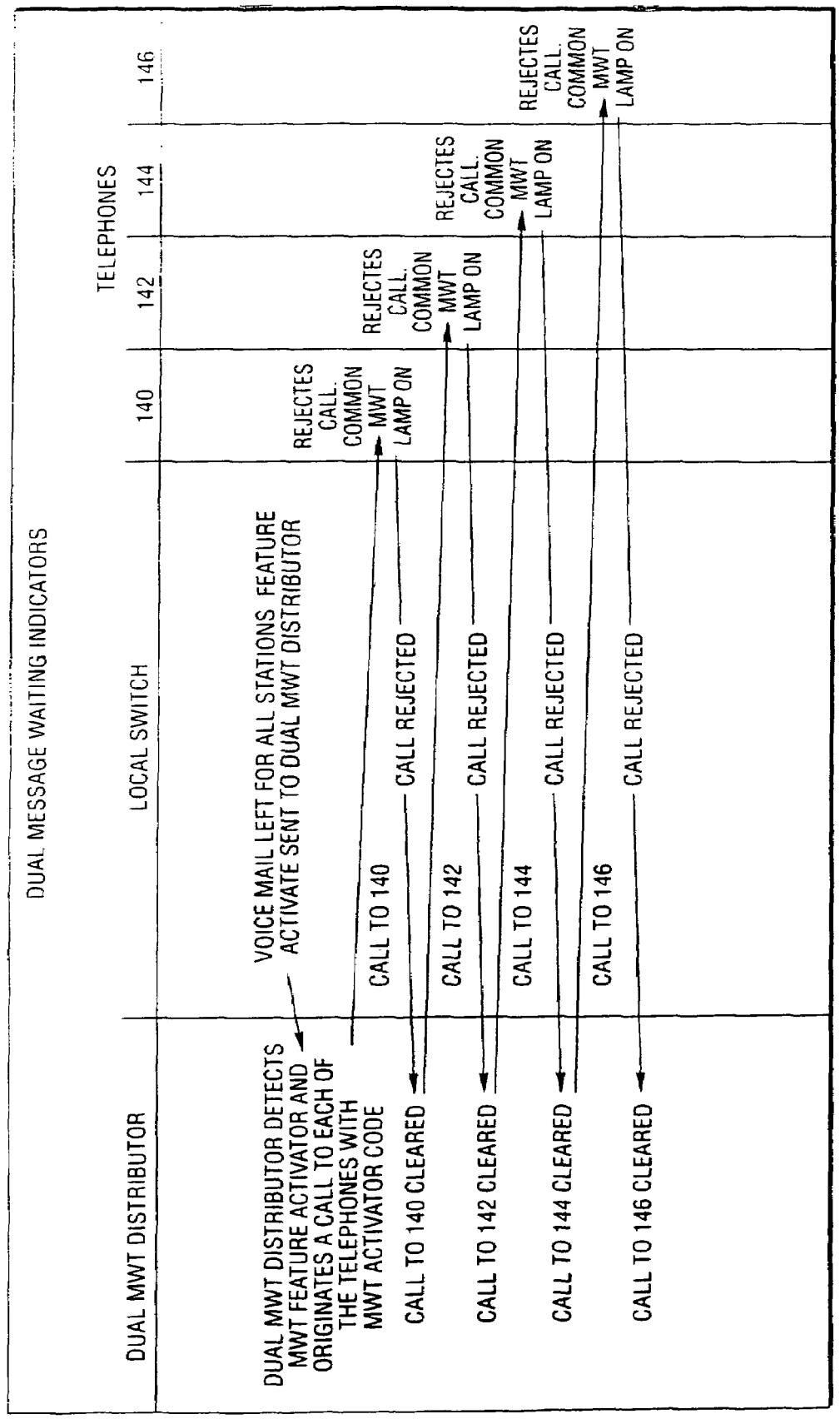
FIG. 12 shows a timeline associated with FIG. 11, for activation of common message waiting indicators.

FIG. 12 shows a timeline of activation of common message waiting indicators. If voice mail is left for telephone 140, the local network switch activates the personal message waiting indicator 148 on telephone 140 in a conventional manner. If voice mail is left in a common voice mail box for all users of telephones 140-146, the local network switch sends a common message waiting feature activation over the D channel to the distributor 166 which activates its common message waiting lamp 164.

Figure 14:
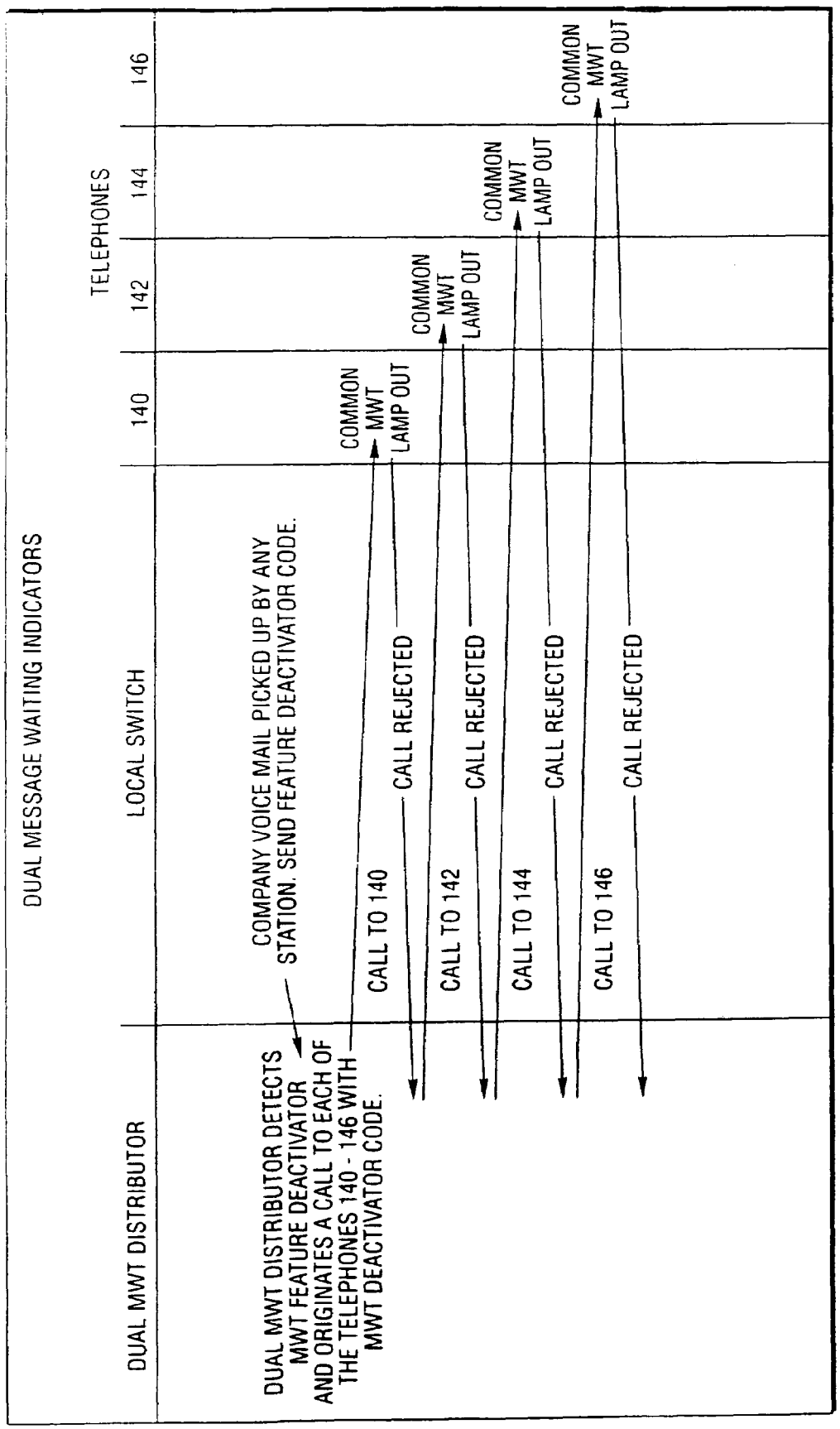
FIG. 14 shows a timeline associated with FIG. 11, for deactivation of common message waiting indicators.

As shown in the timeline of FIG. 12 and the flowchart of FIG. 13, the dual MWT distributor 166 monitors the D channel as indicated at block 170. If the common MWT feature activation is detected, as determined at decision block 172 the distributor 166 energizes common MWT lamp 164 at block 174 and at block 176 places a series of calls to the telephones 140-146 using directory numbers stored in its RAM. Each of the telephones 140-146, is programmed to detect a common message waiting activator code contained in the call from distributor 166. When the code is detected, the call is rejected and the common message waiting lamp is energized. As each call is rejected a call is placed to the next telephone, until all common message waiting lamps 156-162 are energized, as determined at block 178. If any user at telephones 140-146 responds to the common message waiting, the local network switch sends a common message waiting feature deactivator to the distributor 166. Upon detection of the feature deactivator, the distributor 166 extinguishes the lamp 164 and initiates calls to the telephones 140-146 to extinguish the lamps 156-162 as indicated in the timeline of FIG. 14 and in blocks 180-188 of the flowchart in FIG. 15.

Figures 16, 17:
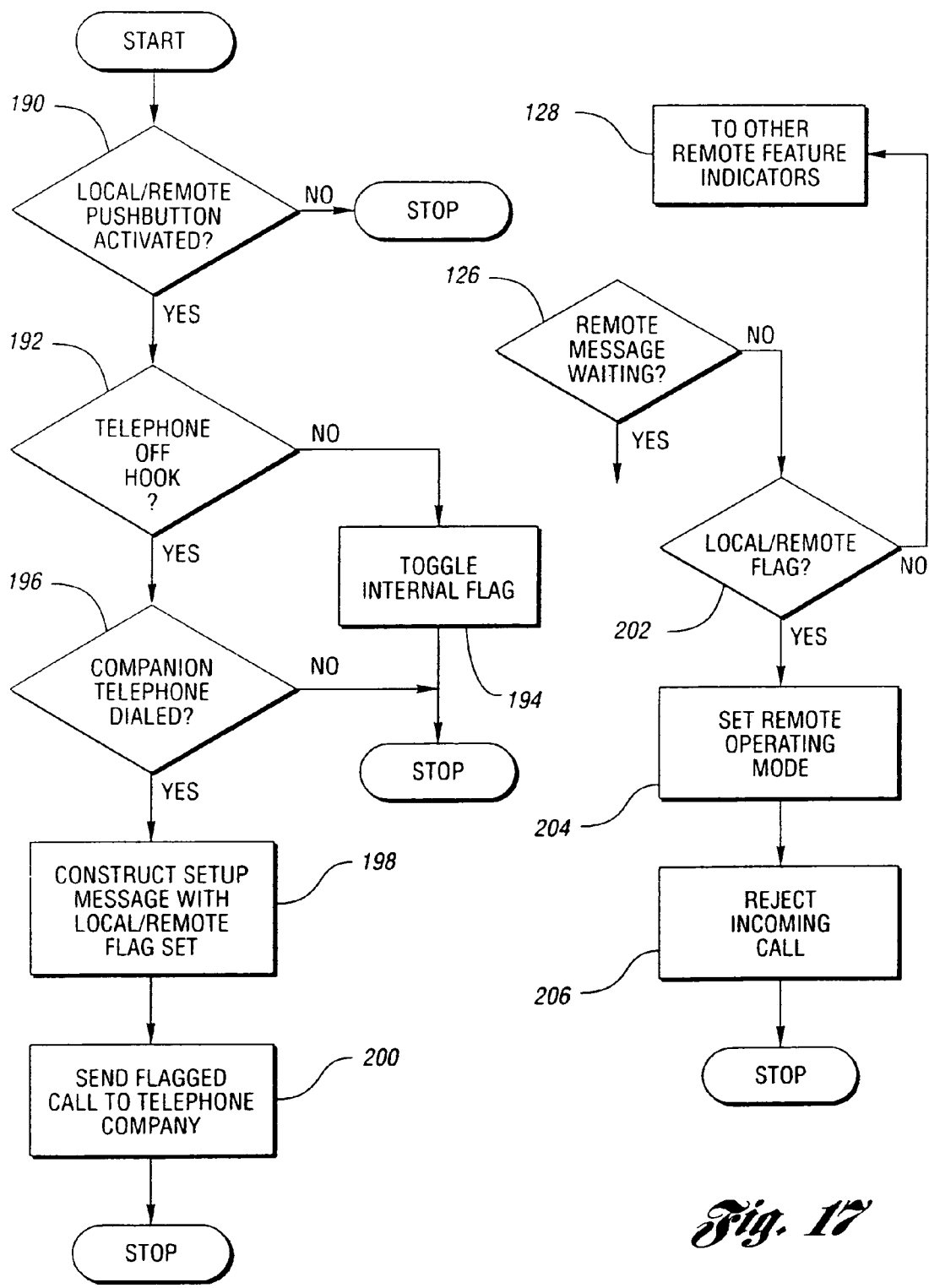
FIGS. 16 and 17 are flowcharts of software controlling the remote switching of the mode of operation of one telephone by another telephone.

The Remote/Local pushbutton 38 is actuable by the telephone user, while the telephone is on hook, to set or reset an internal software flag depending upon whether the telephone is to be operated in the remote or local mode respectively. The operating mode of a companion telephone may also be placed in the remote operating mode through actuation of the pushbutton 38 as depicted in the flowcharts of FIGS. 16 and 17. Referring to FIG. 16 manual activation of the pushbutton 38 is detected at block 190. If the telephone is not off hook, as determined at block 192, then an internal flag is toggled at block 194 and the light for pushbutton 38 is either energized or extinguished depending on its previous state. If, for example, telephone 14 is off hook and the pushbutton 38 is actuated, the user may be prompted to enter the companion telephone number i.e. the number of telephone 12, if it is desired to place telephone 12 in a remote mode of operation. If the number is entered within a predetermined interval of time, as detected at block 196, a setup message or D channel packet message is constructed as indicated at block 198 and sent to the companion telephone as indicated at block 200. The outgoing message contains a Local/Remote flag or code which when detected by the companion telephone will reset the companion telephone to the remote operating mode.

With reference to FIG. 17, a flowchart is shown depicting the software for resetting the telephone 12 to the remote operating mode from the telephone 14. A decision block 202 is interposed between the blocks 126 and 128 of FIG. 8 and checks whether a D channel message contains a Local/Remote flag or code. If so, the operating mode of telephone 12 is reset to the remote mode at block 204 and the incoming call is rejected at block 206. An incoming call to the WAW telephone 12 will now be automatically transferred to the WAH telephone 14, as discussed previously.

The procedures outlined above with respect to the use of information elements may also be used by the remote user to change the target telephone number. In FIG. 1, Station B would, for example, be remotely programmed from Station C to call a telephone at an alternate location. Using a combination of the features described above a user could call through a remote Station to take advantage of certain billing rates. In FIG. 1, Station B, for example, would call Station C which would then provide a dialtone to Station B permitting Station B to dial another call that would be billed to Station C. The information elements could also be used as described above to access a call log on a remote telephone. This feature is useful when voice mail is not available. The present invention can also be used to monitor sound at a remote location. In FIG. 1, Station C, for example, would place a call to Station B. The call from Station C would carry an information element that would cause Station B to automatically go off-hook in the speakerphone mode, without audible alerting, lights, display, or speaker. Only the microphone would be activated. This would allow the WAH user to monitor any audible sounds at the WAW location. When the features of remote message waiting or remote programming of target numbers are used, a Station may "call back" to provide assurance the feature was understood. For example, in FIG. 1, if Station B turns on Station C's message waiting lamp, Station C would call back to Station B to report the status of Station C's message waiting light.

While the best mode for carrying out the present invention has been described in detail, those familiar with the art to which this invention relates will recognize various alternative designs and embodiments for practicing the invention as defined by the following claims.

The invention claimed is:

1. An Integrated Services Digital Network (ISDN) telephone operable in one of a remote mode and a local mode, the telephone comprising:
  a memory system configured to store data and instructions; and
  a processor coupled with the memory system and operating with the stored data and instructions to establish call control procedures,
    in response to a first message received from over a network, the first message containing a first code identifying the origin of an incoming call and indicating that the incoming call should be transferred from a second ISDN telephone to the ISDN telephone and responsive to operation in the remote mode, the processor operative to send a second message to the second telephone, the message including the first code and a second code identifying the origin of the second message,
    in response to a third message from the second telephone requesting transfer of the incoming call, the processor operative to initiate a network transfer of the incoming call to the ISDN telephone, disconnecting the second ISDN telephone from the incoming call.

2. The ISDN telephone of claim 1 further comprising a local/remote mode actuator in data communication with the processor.

3. The ISDN telephone of claim 2 wherein the local/remote mode actuator comprises a pushbutton of the telephone.

4. The ISDN telephone of claim 2 wherein the local/remote mode actuator comprises the processor and stored data and instructions responsive to a mode change instruction received over the network.

5. The ISDN telephone of claim 1 further comprising a network interface configured to receive messages transmitted over an ISDN D channel.

6. The ISDN telephone of claim 5 wherein the network interface is configured to provide connection between a system bus of the ISDN telephone and an ISDN signaling channel and a communication channel.

7. An Integrated Services Digital Network (ISDN) telephone comprising:
  a network interface configured to communicate with a network;
  a memory system configured to store data and instructions; and
  a processor coupled with the network interface and the memory system and configured to operate with the stored data and instructions to establish call control procedures, the processor responsive to a message waiting activation signal received over the network to construct a coded message indicating a voice mail message on the network, the processor further operative to transmit the coded message to a second telephone.

8. The ISDN telephone of claim 7 further comprising a system bus coupling the network interface, the memory system and the processor and wherein the network interface is configured to provide connection between the system bus and an ISDN signaling channel and a communication channel.

9. The ISDN telephone of claim 8 wherein the message waiting activation signal and the coded message are received on the ISDN signaling channel.

* * * * *